United States Patent [19]

Xu et al.

[11] Patent Number: 5,644,988
[45] Date of Patent: *Jul. 8, 1997

[54] PRINTING METHOD OF APPLYING A POLYMER SURFACE MATERIAL AND SUBSTRATE PRODUCED BY THE METHOD

[75] Inventors: Ming Xu; Nathan S. Hale, both of Mt. Pleasant, S.C.

[73] Assignee: Sawgrass Systems, Inc., Mt. Pleasant, S.C.

[*] Notice: The term of this patent shall not extend beyond the expiration date of Pat. No. 5,431,501.

[21] Appl. No.: 586,406

[22] Filed: Jan. 16, 1996

Related U.S. Application Data

[62] Division of Ser. No. 309,933, Nov. 7, 1994, Pat. No. 5,522,317, which is a continuation of Ser. No. 195,851, Feb. 10, 1994, Pat. No. 5,431,501, which is a continuation-in-part of Ser. No. 724,610, Jul. 2, 1991, Pat. No. 5,302,223, which is a continuation-in-part of Ser. No. 549,600, Jul. 9, 1990, abandoned.

[51] Int. Cl.$^6$ ..................................................... B41L 35/14
[52] U.S. Cl. ................................... 101/488; 400/120.18
[58] Field of Search .................... 400/120.02, 120.04, 400/120.08, 240, 241.1, 120.18; 101/470, 488; 156/230, 240, 583.1; 346/76 PH

[56] References Cited

U.S. PATENT DOCUMENTS

| 4,021,591 | 5/1977 | DeVries et al. | 101/470 |
| 4,122,459 | 10/1978 | Schloemann et al. | 101/336 |
| 4,844,770 | 7/1989 | Shiraishi et al. | 400/120 |
| 5,263,781 | 11/1993 | Mima et al. | 400/120 |

*Primary Examiner*—Ren Yan
*Attorney, Agent, or Firm*—B. Craig Killough

[57] ABSTRACT

An image is permanently transferred to a substrate having a cotton component, or other component which is absorbent or porous, from a medium printed with the image by a thermal printer using heat activated ink. A polymer surface preparation material and the ink are transferred by the thermal printer to the medium from a ribbon containing the ink and the surface preparation material, without activating the ink or the surface preparation material. The image is transferred from the medium to the substrate by applying sufficient heat and pressure to the medium to activate and transfer the ink and the surface preparation material, with the surface preparation material bonding the ink to the substrate.

10 Claims, 3 Drawing Sheets

PRINTING METHOD OF APPLYING A POLYMER SURFACE MATERIAL AND SUBSTRATE PRODUCED BY THE METHOD

This is a divisional application of Ser. No. 309,933, Nov. 7, 1994, U.S. Pat No. 5,522,317, which is a continuation of Ser. No. 195,851, Feb. 10, 1994, U.S. Pat. No. 5,431,501, which is a continuation-in-part of Ser. No. 724,610, Jul. 2, 1991, U.S. Pat. No. 5,302,223, which is a continuation-in-part of Ser. No. 549,600, Jul. 9, 1990, abandoned.

FIELD OF THE INVENTION

This invention relates to printing generally and is more specifically directed to a method of thermally printing heat activated ink and thermally printing a surface preparation material onto paper or other printable material as a medium, and subsequently heat activating the ink and surface preparation material, thereby transferring the design formed by the ink from the medium to a substrate on which the design is to permanently appear.

BACKGROUND OF THE INVENTION

Words and designs are frequently printed onto clothing and other textile materials, and other objects. Common means of applying such designs to objects include the use of silk screens, and mechanically bonded thermal transfers. Silk screen process is well known in the art, and a mechanical thermal process to textile materials is described in Hare, U.S. Pat. No. 4,244,358.

The use of computer technology allows a virtually instantaneous printing of images. For example, video cameras or scanning may be used to capture an image to a computer. The image may then be printed by any suitable printing means, including mechanical thermal printers, wet printed (inkjet) heat sensitive transfers and laser printers. These printers will print in multiple colors.

The process of thermal transfers by mechanical means is described in Hare., U.S. Pat. No. 4,773,953. The resulting mechanical image, as transferred, is a surface bonded image with a raised plastic like feel to the touch. The resulting printed image is stiff to the feel, has poor dimensional stability when stretched and poor color range.

Heat activated transfer ink solids change to a gas at about 400° F., and have a high affinity for polyester at the activation temperature and a limited affinity for most other materials. Once the gassification bonding takes place, the ink is permanently printed and highly resistant to change or fading caused by laundry products.

Images produced by heat activated inks, such as sublimation inks, which are transferred onto textile materials having a cotton component do not yield the high quality image experienced when images formed by such inks are printed onto a polyester substrate. Images which are printed using sublimation inks applied by heat and pressure onto substrates of cotton or cotton and polyester blends yield relatively poor results. The natural tendency of the cotton fiber to absorb the ink causes the image to lose its resolution and become distorted.

To improve the quality of images transferred onto substrates having a cotton component, such substrates are surface coated with materials, such as the polymeric coating described in DeVries et. al., U.S. Pat. No. 4,021,591. Application of the surface coating to the substrate allows the surface coating material to bond the ink layer to the substrate, reducing the absorbency of the ink by the cotton and improving the image quality.

In the prior art, coverage of the surface coating material has not been matched to the image. The surface coating material is applied to the substrate over the general area to which the image layer formed by the inks is to be applied, such as by spraying the material or applying the material with heat and pressure from manufactured transfer sheets, which are usually rectangular in shape. The area coated with the surface coating material is therefore larger than the area covered by the ink layer. The surface coating may be seen extending from the margins of the image. The excess surface coating reduces the aesthetic quality of the printed image on the substrate. Further, the surface coating tends to turn yellow with age, which is undesirable on white and other light colored substrates.

Hale, U.S. Pat. Nos. 5,246,518 and 5,248,363 disclose the use of thermal printers to produce an image on a medium or transfer sheet wherein the image is comprised of sublimation or other heat activated inks. The method described in Hale does not activate the ink during the printing of the medium or transfer sheet.

SUMMARY OF THE PRESENT INVENTION

The present invention uses heat activated ink solids. The ink solids are transferred in the desired design by means of a printer onto a medium, which will most commonly be paper. The printer incorporates a thermal process, but operates at a temperature which is below the temperature which will activate the ink solids. Heat activation of the ink solids does not take place at the time of printing of the image by the printer from the ribbon to the medium, but rather takes place at the time of the transfer of the image from the medium to the substrate on which the image is permanently applied.

Sufficient temperature is applied to the medium and the substrate to transfer the image from the medium to the substrate. The heat activates, or sublimates, the ink solids during this transfer from the medium to the substrate. The image is then permanently bonded to the substrate.

The ribbon used with thermal color printers in this process has alternate color panels of cyan, yellow and magenta, respectively. The heat activated ink solids as used do not have an affinity for highly absorbent fibers such as cotton. The present invention introduces a ribbon panel having a polymeric coating thereon, which acts as a surface coating for the cotton component of the substrate.

After the printer makes its third pass to print the image in the desired colors onto the medium, the printer then prints the surface preparation material from the ribbon. The surface preparation material is printed over the entire image, but does not exceed the boundaries of the image. The image is then transferred from the medium to the substrate by the application of heat and pressure, with the surface preparation material permanently bonding the ink solids to the substrate.

DETAILED DESCRIPTION OF THE PREFERRED EMBODIMENT

Figure 1:
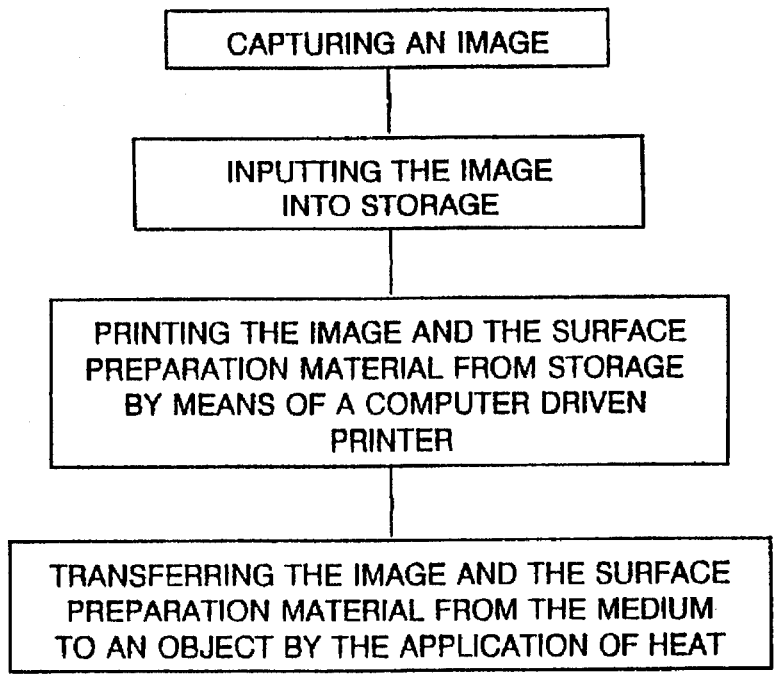
FIG. 1 is a block diagram showing the printing process.
Figure 2:
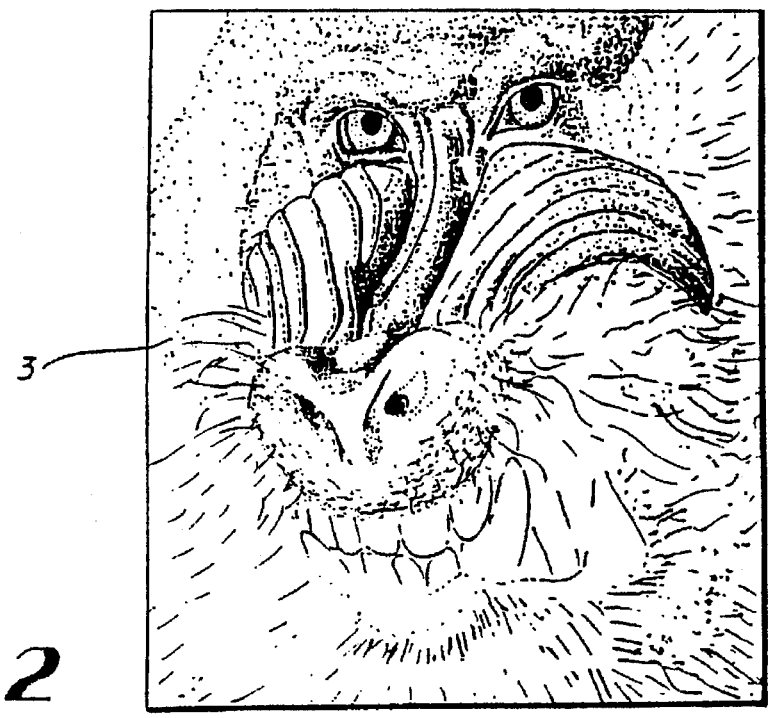
FIG. 2 illustrates an example of a design printed by a printer using the printing process.
Figure 3:
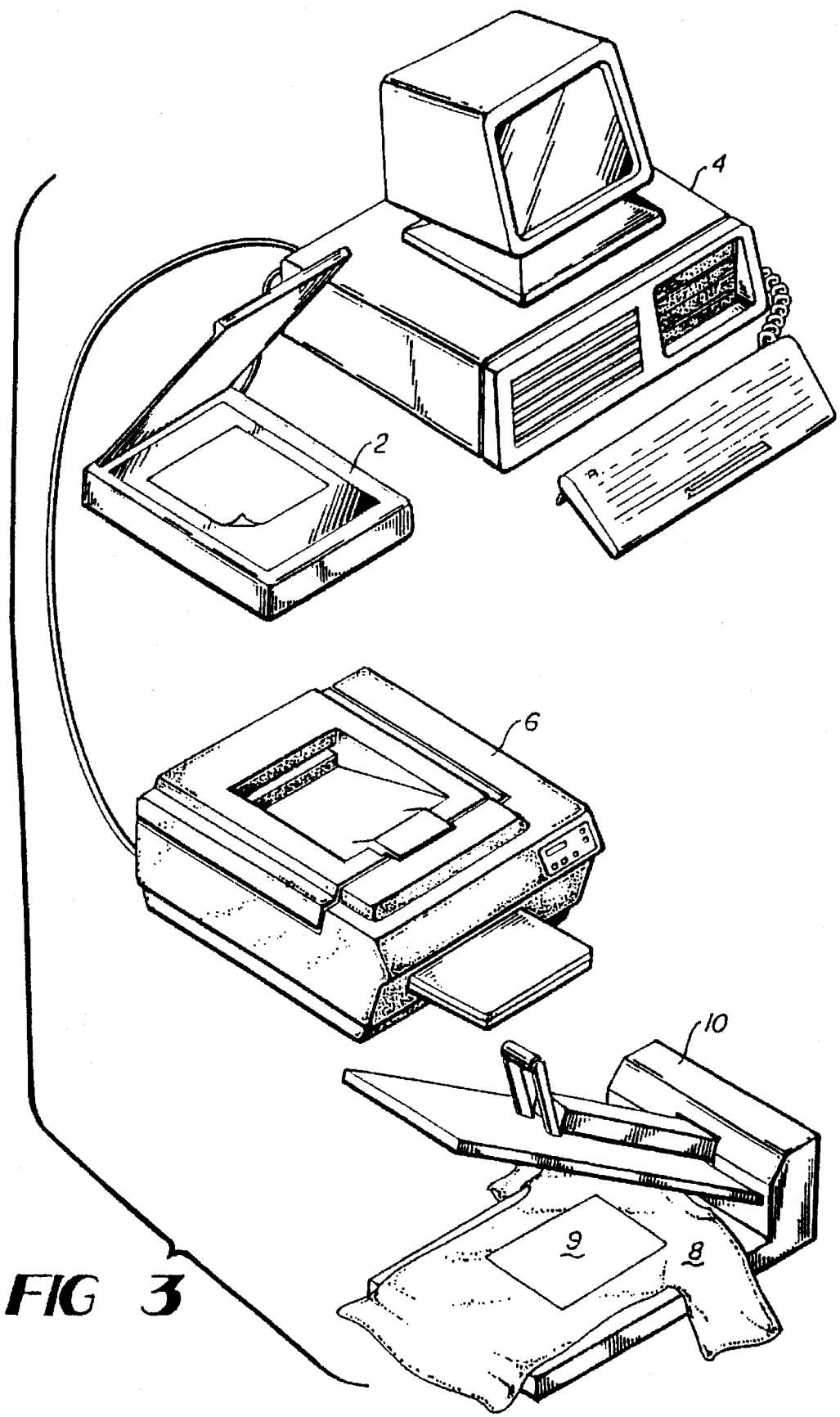
FIG. 3 is a diagrammatic illustration showing exemplary elements of computer and printing systems which could be used to achieve the printing process.
Figure 4:
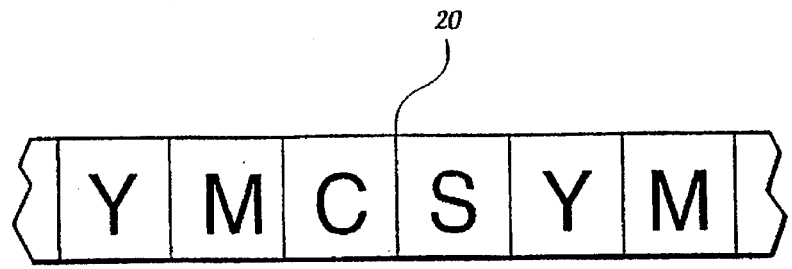
FIG. 4 is a section of a ribbon used with a color thermal printer demonstrating the three color panels of yellow, magenta and cyan respectively, and a fourth panel having surface preparation material thereon, in a repeating pattern.
Figure 5:
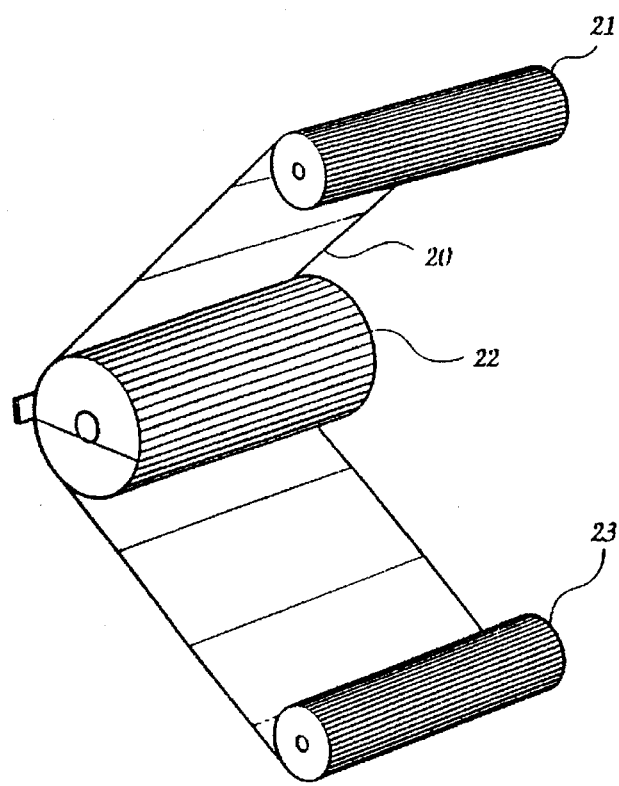
FIG. 5 demonstrates a ribbon on a roll as the ribbon is transported in a thermal printer.
Figure 6:
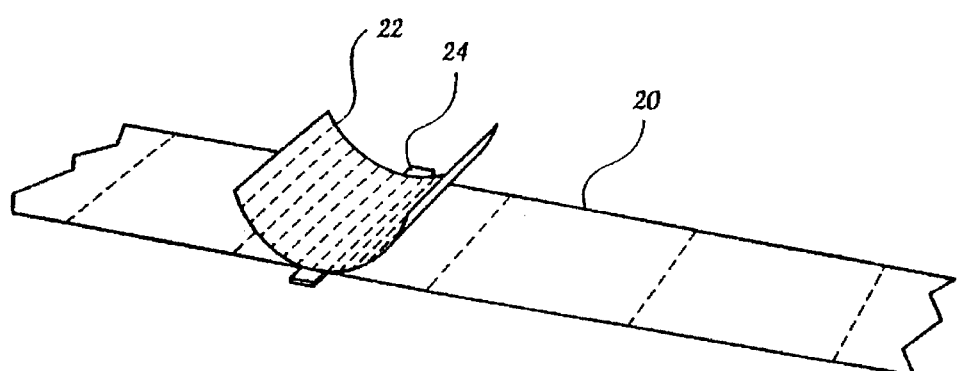
FIG. 6 shows a section of the ribbon as it comes in contact with the print head of the thermal printer.

In the preferred embodiment, a video camera or scanning device 2 is used to capture an image 3. This image is then input into a computer 4. The computer directs a printer 6 to print the image. Any means of inputting an image into a computer may be used, including images generated by software. Available computer design graphic software may be used, or still photography may be used. The design may be photographic, graphic artistic, or simply letters or words. Virtually any printer which will print in response to a computer may be used, including impact, laser or thermal printers. In most applications, a printer which will print in multiple colors is desirable. A thermal printer which will print in what is known as "four pass" (four color) or "three pass" (three color) may be most commonly used, but laser printers having the same multiple color capability are available. The ribbon 20 is taken from a roll 21 past a platen 22 and print head 24 on to a take up roll 26. FIGS. 4 and 5. The use of cyan, yellow and magenta panels on the ribbon allow the printer to print in full color or multi-color designs.

In the present invention, heat activated ink solids are used, and are transferred to a medium by the printer without activating the ink solids. In the preferred embodiment, the heat activated transfer ink solids are transferred onto the medium by the printer from a ribbon.

The ribbon substrate as used with the printer may be a plastic or a polyester ribbon. The dry release, heat activated ink solid may be retained on the ribbon by the use of a heat sensitive material which will release the ink upon the application of heat to the ribbon. The printer, such as a thermal transfer printer, will transfer the ink in the desired design and colors from the ribbon to the medium at a temperature of approximately 195° F. This temperature is sufficient to release the heat sensitive material to allow transfer of the ink solids to the medium, without activating the ink solids. The wax aids in holding the heat activated ink solids on the medium in the precise design, eliminating the need for specially coated paper, while also producing an image which has high resolution.

While in the preferred embodiment the binder and heat sensitive material are applied with the ink solids from a ribbon, other means of applying the ink solids with a binder could be used. Since a wax in liquid form tends to have an affinity for paper, the wax will readily bond with the paper medium, holding the ink solids to the medium, until the ink solids are released by the application of heat which is sufficient to heat activated transfer the ink solids. Virtually any material may be used as a medium which can be printed upon by a printer, and which will withstand the heat activated transfer temperature of approximately 400° F., as described herein. If a thermal printer is used, this medium may be any paper commonly used with thermal printers, however, standard bond paper may be used, or even a sheet of metal, if the metal can be handled by the printer.

A surface preparation material may be applied by the printer to the medium. If a multiple pass thermal printer is used, one panel of the ribbon used with the printer has the surface preparation material thereon.

Color thermal printers print from a ribbon having multiple panels of ink bound to the ribbon. Typically, the panels have recurring sequences of cyan, yellow and magenta ink, from which multiple color or full color images may be produced. An embodiment of the present invention provides an additional panel having a surface preparation material thereon, which is bound to the ribbon.

The surface preparation material may be a polymeric material which is bound to the ribbon by a wax with the heat sensitive material binder which is released by the heat from the printer. The panel having the surface preparation material thereon is introduced into the sequence of panels, so that the sequence includes recurring panels of cyan, yellow, magenta, and surface preparation material.

In use, the thermal printer makes four passes to print the image from the ribbon to the medium. The color image is printed in the desired form and image by means of the three color panels present on the ribbon. The surface preparation material is then printed as the last pass, so that the surface preparation material is applied over the inks as they form the image on the medium.

The surface preparation material is printed only over the inks, but is printed completely over the ink solids. It is desired to have the surface preparation material present on all surfaces of the substrate to which the inks are applied, but an excess of the material on the edges or fringes is not desirable. A problem which the present invention solves is that the gross application of the surface preparation results in yellowing of the fabric, which increases as the fabric is laundered. By applying the surface preparation material only where the ink is applied to the substrate, the surface preparation material is covered by the ink, and no yellowing or discoloration of the substrate by the surface preparation material occurs, and no change in hand or feel of the fabric occurs where the image is not present. The use of the computer controlled printer causes the surface preparation to be completely printed over the image on the medium for complete bonding of the inks, but does not allow the surface preparation material to be applied beyond the edges or margins of the images, excepting for reasonable tolerances.

Once the image and the surface preparation material are printed onto the medium, the image may be permanently transferred onto the substrate presently, or at a later time. Most commonly, the design will be transferred onto a textile substrate, such as a shirt 8, although the image may be transferred onto other materials, such as metal, ceramic, wood, or plastic. The design 3, which is printed onto the medium 9 without activating the ink, is placed against the object 8. A temperature which is sufficient to activate the ink solids is then applied. This temperature will typically be around 400° F. This temperature is applied for a time sufficient to heat activate and transfer the ink solids. A heat transfer machine 10 may be used to accomplish the transfer of the inks from the medium to the substrate. Activation, or sublimation, does not take place at the time of printing the image onto the medium, even though heat may be used to accomplish the printing of the image onto the medium, but occurs during the transfer from the medium to the substrate.

The heat activated ink solid will bond to a synthetic material such as polyester, when sufficient heat is applied for a sufficient time. Accordingly, if the object to which the design is to be Ii applied is a textile material and has a sufficient polyester composition, no surface coating is required, although it may be applied.

Printers other than thermal printers could be used. It is preferred that the surface preparation material be applied antecedent to the printing of the inks to the medium, however, application of the surface preparation material should occur during the printing of the medium. For example, if multiple color ink Jet printing is performed by applying cyan, yellow and magenta inks as instructed by the computer, the surface preparation material should then be applied by the printer over the inks so as to cover the inks by the printer.

It is possible to achieve adequate results by mixing or incorporating the surface preparation material into the ink formulation, along with the ink, binder and other components. For example, one or more of the panels of the ribbon of the multiple pass thermal printer could incorporate a polymeric surface preparation material which is printed onto the medium with the ink and the binder.

The surface preparation material is applied to the medium by the printer without activating the surface preparation material. The paper which comprises the medium may have a cotton content or other absorbent material content, and it is not desired for the surface preparation material to treat the medium. The invention takes advantage of the relatively low heat ranges employed by printers which use heat as part of the printing process. The surface preparation material is not activated by the printer in printing the medium, but is activated by the higher heat used to transfer the inks to the substrate.

The ribbon could be comprised of heat sensitive dye, heat sensitive material, binder material and other additives. A general formulation is shown as:

| Material | Weight % |
| --- | --- |
| Sublimation Dye | 5–30 |
| Heat Sensitive Material | 30–70 |
| Binder | 0–30 |
| Additives | 0–30 |

The sublimation dye could have a sublimation temperature or activation temperature of 120° to 300° C. Examples of such dyes are: C.I. Disperse 3 (cyan), C.I. Disperse 14 (cyan), C.I. Disperse Yellow 54 (Yellow), C.I. Disperse Red 60 (Red), Solvent Red 155 (Diaresin Red K, red), etc. The commercial sources of such dyes including Keystone Aniline's SUBLAPRINT® series, BASF Corporation's BAFIXAN® Transfer Printing dyes series, Eastman Chemical's EASTMAN® disperse series and Crompton & Knowles Corporation's Intratherm® disperse dyes series. The heat sensitive material could be wax or polymer materials with melting temperature between 50°–120° C. Examples of such materials are hydrocarbon wax, montan wax, ester wax, carnauba wax, polyethylene wax, high-fatty acid monoglyceride, etc. Commercial sources of such materials include Moore and Munger Marketing's fully-refined paraffin wax series, Petrolite Chemical's POLYWAX® series, etc. The binder materials could be selected from resin polymer materials having relatively low melting points (<150° C.) and low molecular weights (<500,000). Such materials should have glass transition temperatures higher than 0° C. and low affinity to sublimation dyes of the type used herein. The additives serve to improve dispersion, coating aid, mar, gloss, or other features of the image or the printing and transfer process. Surfactant materials such as DOW CORNING® Additives, or BYK Chemie's DISPER BYK® could be used.

The ribbon substrate is coated with the formulation by means of direct gravure or other similar coating technology. The substrate may be heat-resistant plastic film (e.g., PET mylar, nylon, cellulose, polyamide, etc.) of 4–20 micron thickness or paper of 10–50 microns thickness. Coating may be accomplished by using either solvent coating, or hot-melted, or emulsion form with a resulting dry coating thickness of 2–10 microns. The dry coating on the substrate should have a desired melting temperature as determined by the printer application to achieve proper release of the dry coating during thermal printing.

| Formulation Example 1 | |
| --- | --- |
| Material | Weight % |
| Sublaprint 70069 | 10 |
| Paraffin Wax R-164[2] | 22 |
| Polywax 500[3] | 4 |
| Piccolastic A70[4] | 3.2 |
| PETROTHANE ® NA 601-04[5] | 0.75 |
| DOW CORNING ® 7 Additive[6] | 0.05 |
| Toluene | 10 |
| Heptane | 50 |
| TOTAL | 100% |

[1]Keystone Aniline, USA;
[2]Moore and Munger Marketing, Inc.;
[3]Petrolite Chemical, Inc.;
[4]Hercules Inc.;
[5]Quantum Chemicals, Inc.;
[6]Dow Corning Corporation The formulation of Example 1 may be coated by reverse gravure coating onto 4.5 micron Mylar (DuPont Corporation) at a temperature of 50°–80° C. to achieve a dry thickness of 3 microns.

| Formulation Example 2 | |
| --- | --- |
| Material | Weight % |
| BAFIXAN ® Red BF[1] | 10 |
| CHEMCOR ® Emulsion 10135[2] | 30 |
| MICHEMLUBE 160[3] | 20 |
| MOCRYL ® 132[4] | 10 |
| LUCIDENE ® 395[5] | 5 |
| DAPRO ® DF 880[6] | 0.1 |
| AREOSOL ® PTB[7] | 4.9 |
| Distilled Water | 20 |
| TOTAL | 100% |

[1]BASF Corporation;
[2]Chemical Corporation of America;
[3]Michelman, Inc.;
[4,5]Morton International;
[6]Daniel Products Company;
[7]ARCO Chemical Formulation 2 may be coated after agitation and dispersion by mechanical means by reverse gravure coating onto 4.5 micron Mylar (DuPont Corporation) at room temperature resulting in a dry thickness of 3 microns.

The surface preparation material is coated in sequence on a panel of the ribbon. In the preferred embodiment, there are sequential panels of cyan, yellow and magenta, with a fourth panel coated with a surface preparation material. FIG. 4 demonstrates the sequence of the color panels on the ribbon 20, with Y, M, C, representing yellow, magenta and cyan panels, respectively, and S representing the surface preparation material panel of the ribbon. The surface preparation material is preferred to be a polymer resin (polymer, copolymer and terpolymer) containing polyester, polyvinyl acetate and/or polyurethane, etc. with a relatively low melting temperature (<200° C.). Such materials possess the molecular function group of

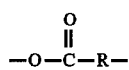

and achieve satisfactory results as receptor sites for sublimation dyes at the sublimation temperature of the dyes, and possess an hydroxyl function group which bonds with cotton fabric. In order to have satisfactory bonding with the cotton fabric at the fabric swelling stage during thermal process and adequate flexibility of the final product, the surface preparation material should have a glass transition temperature lower than 100° C. Furthermore, to have a "non-sticky" hand or feel of the coated substrate, and fastness of the dye onto the substrate, the polymer resins should have a glass transition temperature which is above −50° C., and preferably above −20° C. The surface preparation materials can be selected from a group comprising poly(methyl methacrylate), poly(vinyl acetate), polyether polyurethane, poly(ethyl methacrylate), poly(methyl acrylate), poly(ethyl acrylate), poly(isobutyl acrylate), poly(isobutyl methacrylate), poly(butyl acrylate), poly(butyl methacrylate), poly(benzyl methacrylate), poly(2-ethylhexyl acrylate), poly(2-ethylhexyl methacrylate), poly (hexyl methacrylate), poly(butylene terephthalate), poly (vinyl butyral), poly (vinyl stearate), poly(octadecyl methacrylate), etc. and the copolymer or terpolymer with other polymer materials with low melting point, low glass transition point poly(vinyl ethyl ether), poly(vinyl chloride), poly(vinylidene fluoride), poly(vinyl methyl ether), etc. Generally, such surface preparation polymers have molecular weights of less than 500,000, and can be coated onto a ribbon in a hot melt, solvent or water-reducible emulsion.

An antioxidant can be added into the polymer component, in order to prevent oxidation of the polymer at elevated temperatures. Without such antioxidant, most polyesters and polyvinyl acetates will turn yellow due to the chemical oxidation process with the oxygen in the air. Approximately 0.1%–5% (by weight) of antioxidant can be added to the formulation during the ribbon manufacturing stage. Examples of such antioxidant materials include Raschig Corporation's RALOX® Antioxidants, Eastman Chemical's AQUASTAB® Antioxidants and Ethyl Corporation's ETHANOX® Antioxidants, etc.

Printers using methods other than the method employed by multiple pass thermal printers as described above may be used. Color inks or toners are printed onto a medium, which may be paper, without activating or sublimating the ink or dye. The surface preparation material is printed over the ink layer. Upon subsequent transfer of the ink layer to the substrate, the surface preparation material will have direct contact with the substrate. As above, activation of the resins of the polymeric surface preparation material occurs during the higher temperature process of transferring the inks from the medium to the substrate. Cross linking and bonding of the surface preparation material to the substrate occurs during this sublimation transfer stage.

The method may be used with ink-jet, bubble jet and phase change ink-jet printing. With these printers, the preparation material is applied in the same manner as the ink material. If three colors are used in the printer, a fourth reservoir and fourth printing nozzle is provided in addition to the reservoirs and nozzles provided for the cyan, yellow, and magenta inks. Viscosity and stability of viscosity, foaming, heat sensitivity, printing filter porosity, and other variables are controlled to ensure proper delivery of the preparation material, in the same manner as the color inks.

Ink used in ink-jet and bubble-jet printing may comprise monomer or polymer materials in either solvent or emulsion form, an initiator or catalyst (which may be compounded into the inks so as to provide separation from the polymer), a corrosion inhibitor, a flow control aid, a viscosity stabilization aid, an evaporation control agent, an anti-foaming chemical, a fusing control agent, fungicides, and anti-oxidants. Formulation Example 3 is an example of an ink composition comprising heat activated inks and a polymeric surface preparation which may be used with ink jet printers.

Phase change ink jet printers use a solid ink which may be in stick form. This "ink stick" comprises heat sensitive inks, wax material, polymer binder and additives such as those used in the ink jet formulation above to control, melting, flow, corrosion and other variables. The ink is changed from solid to liquid by melting the ink stick in a controlled fashion to apply the inks and achieve printing. The inks may be applied in three or more colors, such as cyan, yellow and magenta to achieve multi-color or full color printing. A solid stick comprising a polymeric surface preparation is provided. Wax material, a polymer binder and additives may be included. The surface preparation material is applied from this solid stick over the image printed by the printer onto the medium, for the reasons described above. Alternatively, the surface preparation material could be combined with one or more of the ink sticks containing the inks or dyes, with the surface preparation material applied to the medium along with the ink or dye as the medium is printed. As described above, it is desirable for the surface preparation material to be applied as or from a top layer of the dye layer of the medium so that the surface preparation material contacts the surface of the substrate as the image is applied to the substrate.

| Formulation Example 3 | |
|---|---|
| Material | Weight % |
| SEQUABOND ® 3010AF[1] | 25 |
| SEQUABOND ® 3300[1] | 10 |
| LUCIDENE ® 6452[2] | 10 |
| Plyamul40305-00[3] | 10 |
| NA-SUL ® corrosion inhibitor[4] | 0.25 |
| NALCO ® 2309[5] | 0.25 |
| PENTEX ® 99[6] | 0.05 |
| KATHON ®PFM[7] | 0.01 |
| DYNAGEL ® (100bloom)[8] | 0.30 |
| DPG | 4.00 |
| Distilled Water | 40.14 |
| TOTAL | 100% |

[1] Sequa Chemicals, Inc;
[2] Morton International;
[3] Reichold Chemicals, Inc;
[4] King Industries;
[5] Nalco Chemical Company, Specialty Chemicals;
[6] Rhone-Poulenc, Specialty Chemicals Division;
[7] Rohm and Haas Company;
[8] Dynagel Inc.

The method may be used with laser printers and color copier machines. The preparation material is compounded with magnetic sensitive material of very fine particle size. The initiating temperature of bonding of the polymeric surface preparation material is adjusted so that it is higher than the fuser temperature used in the laser printer and color copier (i.e., less than 400 degrees F.) so that the surface preparation material does not cause significant bonding to the medium.

The application of inks to absorbent materials such as cotton fiber substrates may be successfully achieved by grafting. By definition, grafting is the permanent attachment and "growth" of a new material onto an existing substrate.

Chemical grafting involves attachment and polymerization of monomers to a substrate to modify or improve the properties of the substrate without any damage of the substrate itself. By using different type of monomers and initiators, chemical grafting provides a purely chemical method of activating bonding sites on a substrate and the compounding and crosslinking of a monomer/polymer with the structure of the substrate under different conditions, such as certain temperature, curing method and catalyst systems.

Grafting has advantages over conventional fabric modification methods such as chemical coating. Chemical grafting is suitable for cotton, nylon, silk, jute, polypropylene, polyester and other fibers to achieve end use purposes, including increasing fabric dying ability. The permanent attachment and extremely thin layer produced by grafting onto substrates generates new applications for certain fibers. For example, polyether polyurethanes can be used to improve the dying ability of cotton fibers through chemical grafting in combination with the use of modified polyethylene glycols. Grafted materials have been proven to possesses much higher resiliency and dying color strength than the fabric itself.

Depending upon the particular substrate and end use of the substrate, chemical grafting can be performed using different grafting materials (i.e. monomer/polymer materials, catalyst, curing method, etc.) such as polyurethane, urea formaldehyde, polyester, polyether, polyvinyl acetate, polyacrylic acetate, and can be accomplished by using UV-curing, catalyst curing or/and thermal curing methods.

What is claimed is:

1. A method of printing a design and a polymeric surface material, comprising the steps of:

a. printing a design by means of a computer driven printer onto a medium;

b. printing a polymeric surface material by means of a computer driven printer onto the medium and over said design, so as to cover said design with said polymeric surface material, but wherein said polymeric surface material is not substantially printed onto said medium beyond outside margins of said design, and wherein said printing of said polymeric surface material is at a temperature which is below the temperature at which said polymeric surface material is activated; and c. transferring said design and said polymeric surface material from said medium to a substrate on which the design is to permanently appear by applying heat to said medium at a temperature which is above the temperature at which said polymeric surface material activates, wherein said polymeric surface material is activated and said polymeric surface material is bonded to said substrate, and said design deposited onto said substrate from said medium is bonded to said substrate by means of said polymeric surface material.

2. A printed substrate produced by the method of printing a design using a polymeric surface material as described in claim 1.

3. A method of printing a design using a polymeric surface material, comprising the steps of:

a. preparing a thermal printer ribbon having at least one panel comprising ink solids, and having at least one other panel comprising a polymeric surface material;

b. printing by thermal means said ink solids in a desired design onto a medium;

c. printing by thermal means said polymeric surface material onto the medium in the design formed by the ink solids, so as to cover said design formed by said ink solids with said polymeric surface material, but wherein said polymeric surface material is not substantially printed onto said medium beyond outside margins of said design, and wherein said thermal printing of said polymeric surface material is at a temperature which is below the temperature at which said polymeric surface material is activated; and d. transferring said ink solids and said polymeric surface material from said medium onto a substrate on which the design is to appear by applying heat to said medium at a temperature which is above the temperature at which said polymeric surface material activates, so as to cause said polymeric surface material to activate, wherein said polymeric surface material bonds to said substrate and said ink solids are deposited onto said substrate from said medium and are bonded to said substrate in the desired design by means of said polymeric surface material.

4. A method of printing a design using a polymeric surface material as described in claim 3, wherein said panels comprising ink solids comprise cyan, yellow and magenta ink solids.

5. A printed substrate produced by the method of printing a design using a polymeric surface material as described in claim 4.

6. A printed substrate produced by the method of printing a design using a polymeric surface material as described in claim 3.

7. A method of printing a design using a polymeric surface material, comprising the steps of:

a. preparing multiple ink compositions, each comprising a different color ink;

b. preparing a composition comprising a polymeric surface material;

c. printing each of said ink compositions onto a medium by means of a computer driven ink jet printer wherein a design is formed on said medium by means of the printed ink compositions;

d. printing said polymeric surface material onto said medium by means of said ink jet printer, wherein said printing of said polymeric surface material is by means of a nozzle of said ink jet printer other than nozzles from which print said ink compositions are printed, wherein said design on said medium is covered by so printing said polymeric surface material, but wherein said polymeric surface material is not substantially printed onto to said medium beyond outside margins of said design, and wherein said thermal printing of said polymeric surface material is at a temperature which is below the temperature at which said polymeric surface material is activated; and e. transferring said design and said polymeric surface material from said medium onto a substrate on which the design is to appear by applying heat to said medium at a temperature which is above the temperature at which said polymeric surface material activates, so as to cause said polymeric surface material to activate, wherein said polymeric surface material is bonded to said substrate and said design is deposited onto said substrate from said medium and is bonded to said substrate by means of said polymeric surface material.

8. A printed substrate produced by the method of printing a design using a polymeric surface material as described in claim 7.

9. A method of printing a design using a polymeric surface material, comprising the steps of:

a. preparing an ink composition comprising a polymeric surface preparation material, a dye and a magnetic sensitive material;

b. generating an image by means of a computer;

c. printing said image on a medium by means of said ink composition using a printer driven by said computer, wherein said printing of said ink composition by said printer is at a temperature which is below a temperature at which said polymeric surface material is activated;

d. removing said medium from said printer; and e. transferring said image from said medium onto a substrate on which the image is to appear by applying heat to said medium at a temperature which is above the temperature at which said polymeric surface material activates, so as to cause said polymeric surface material to activate, wherein said polymeric surface material bonds to said substrate and said image is deposited onto said substrate from said medium and is bonded to said substrate by means of said polymeric surface material.

10. A printed substrate produced by the method of printing a design using a polymeric surface material as described in claim 9.

* * * * *